Aug. 7, 1923.  
R. F. LINDSAY  
1,464,433  
PROCESS OF AND APPARATUS FOR MANUFACTURING ICE  
Filed May 24, 1921  4 Sheets-Sheet 3
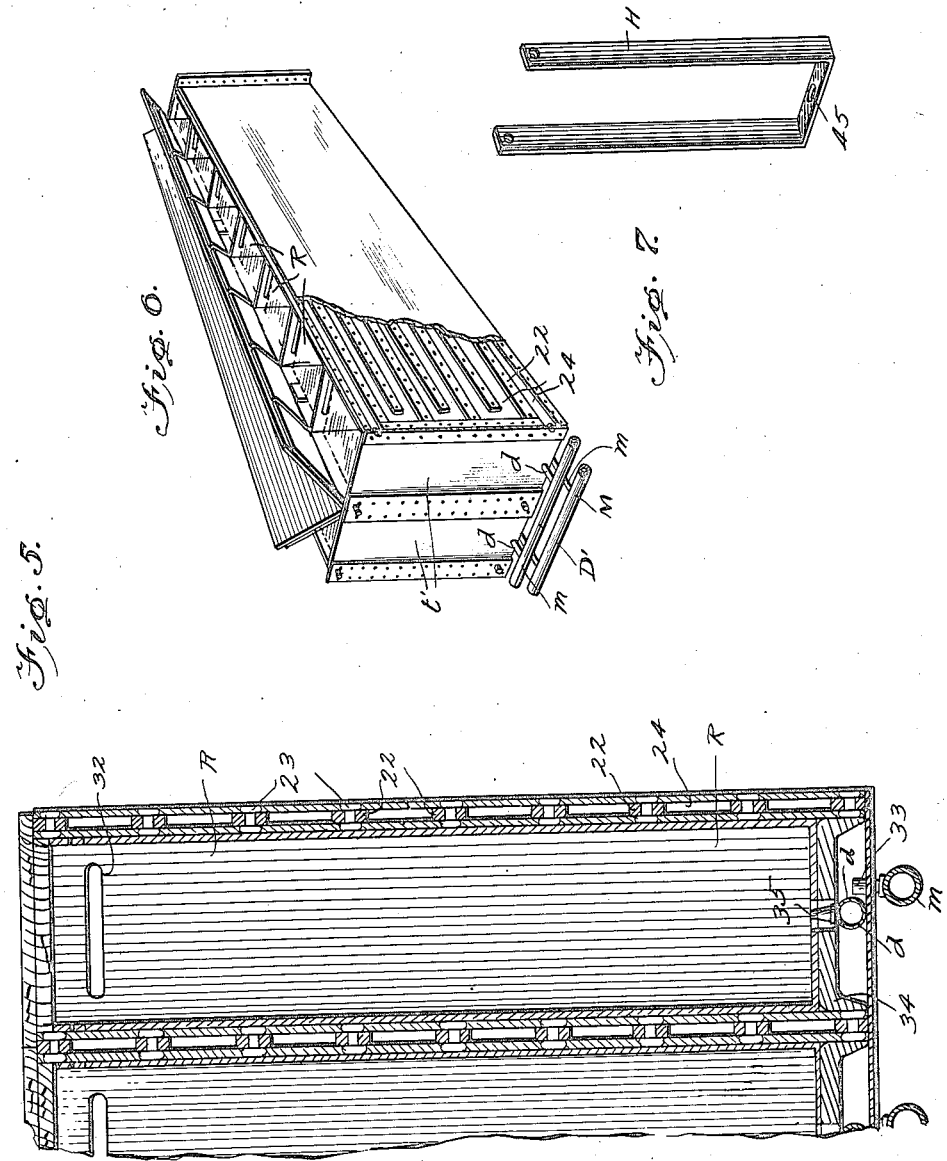

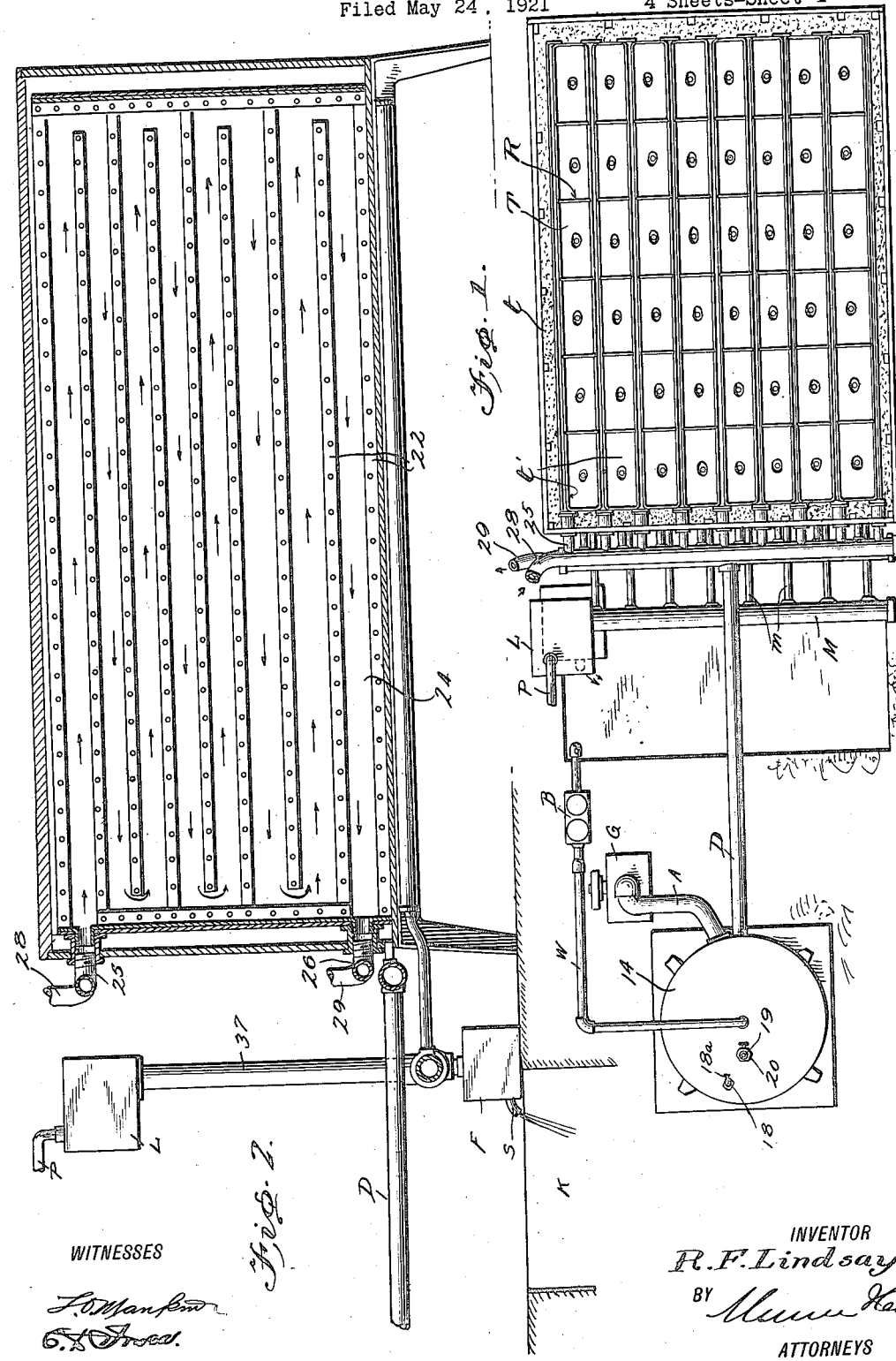

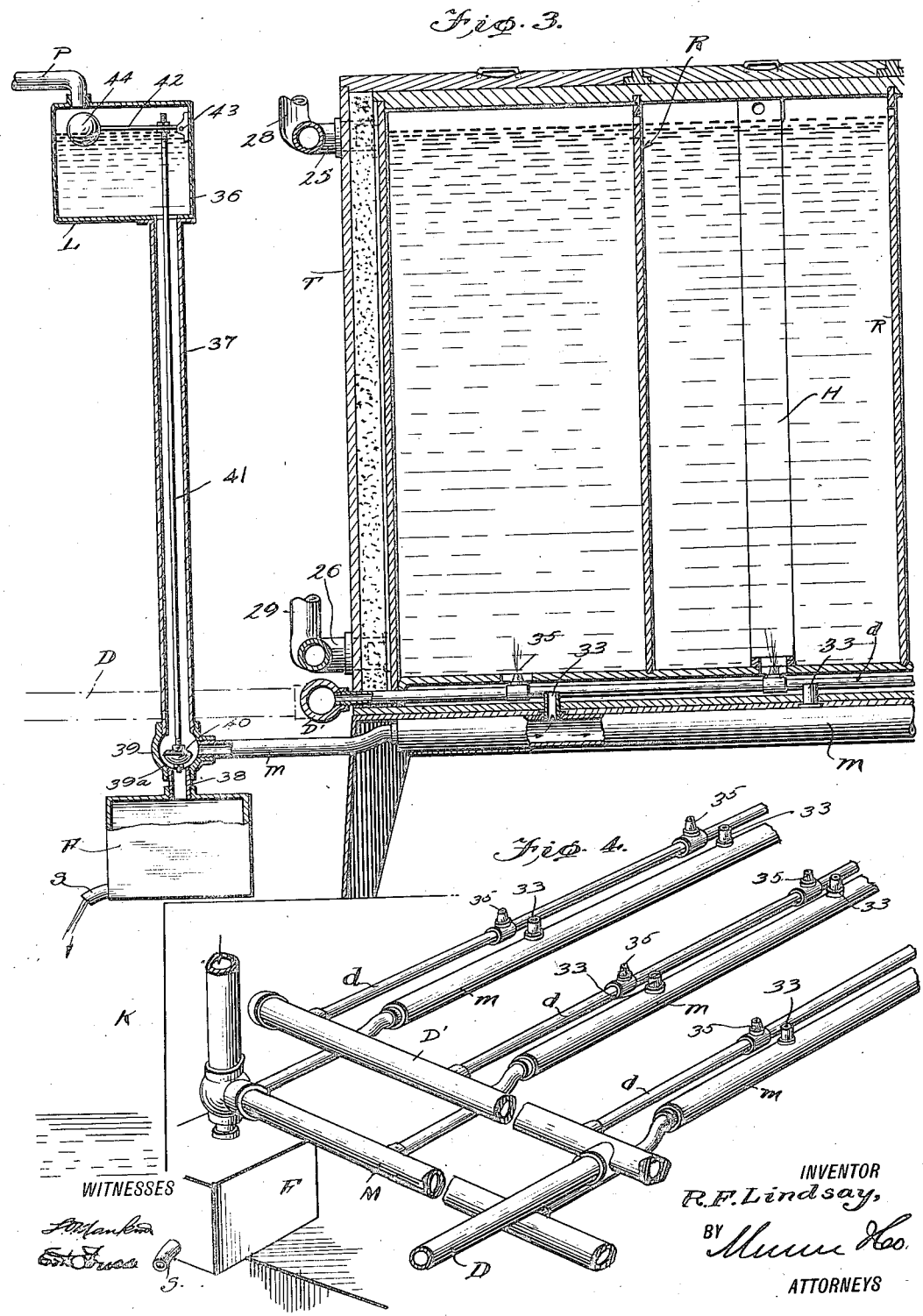

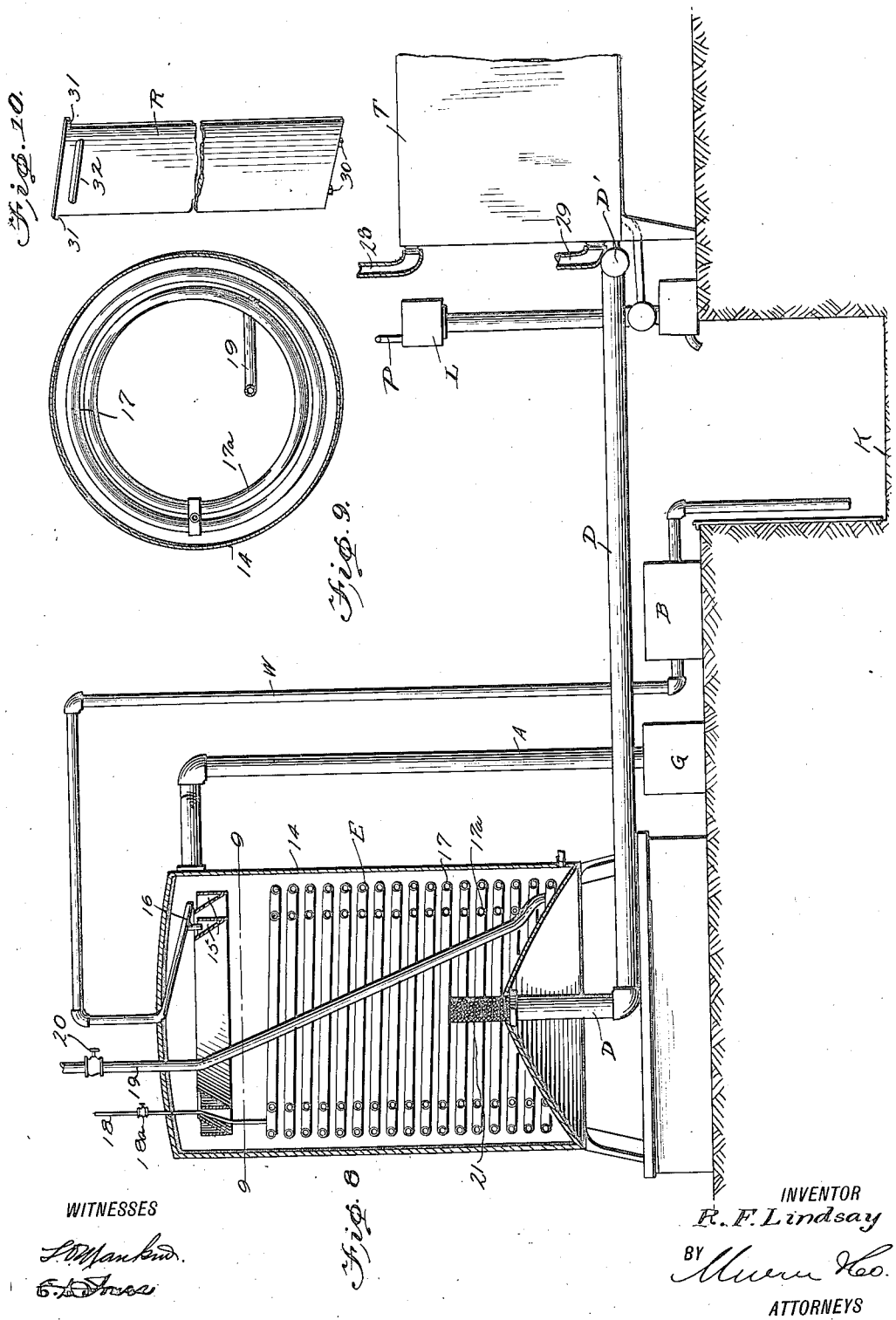

Patented Aug. 7, 1923.

1,464,433

UNITED STATES PATENT OFFICE.

ROBERT F. LINDSAY, OF COLUMBIA, SOUTH CAROLINA, ASSIGNOR TO MARY EVANS BROWN, OF COLUMBIA, SOUTH CAROLINA.

PROCESS OF AND APPARATUS FOR MANUFACTURING ICE.

Application filed May 24, 1921. Serial No. 472,050.

*To all whom it may concern:*

Be it known that I, ROBERT FRANKLING LINDSAY, a citizen of the United States, and a resident of Columbia, in the county of Richland and State of South Carolina, have invented certain new and useful Improvements in Processes of and Apparatus for Manufacturing Ice, of which the following is a specification.

My invention relates to processes of and apparatus for making ice, and the purpose of my invention is the provision of a process of and apparatus for manufacturing ice by means of which pure crystal ice can be made from any water irrespective of the impurities contained in the water.

It is also a purpose of my invention to provide a process and apparatus which eliminates the use of brine and its attendant disadvantages, and which permits of the harvesting of the ice in the day time and in blocks of different sizes, the apparatus being so constructed and operated to economize power and labor with the desirable advantage of a low manufacturing cost.

I will describe one process and one form of apparatus each embodying my invention, and will then point out the novel features thereof in claims.

In the accompanying drawings:

Figure 1 is a view showing in top plan one form of ice making apparatus embodying my invention with the cover of the freezing tank removed.

Figure 2 is a vertical longitudinal sectional view of the freezing tank and adjacent parts comprised in the apparatus shown in Figure 1.

Figure 3 is an enlarged fragmentary sectional view of the freezing tank taken in a vertical plane different from the section of Figure 2 and showing the adjacent parts also in section.

Figure 4 is an enlarged fragmentary perspective view of a portion of the piping system employed in the apparatus shown in Figure 1.

Figure 5 is an enlarged fragmentary transverse sectional view of a portion of the tank shown in Figures 2 and 3.

Figure 6 is a perspective view of two endmost tanks comprised in the freezing tank.

Figure 7 is a perspective view of one of the stirrups employed in the freezing tank.

Figure 8 is a view showing in side elevation and partly in section a portion of the apparatus shown in Figure 1.

Figure 9 is a transverse sectional view taken on the line 9—9 of Figure 8.

Figure 10 is an enlarged detail perspective view of one the partitions comprised in the freezing tank as shown in Figures 2, 3 and 4.

Similar reference characters refer to similar parts in each of the several views.

Referring specifically to the drawings and particularly to Figures 1 and 8, my apparatus in its present embodiment consists of a freezing tank designated generally at T to which water is supplied from a pipe P connected to a suitable source of water supply and in communication with a level governor designated at L. The governor L in turn communicates wth a main distributing pipe designated at M provided with branch pipes $m$ that communicate with the bottom of the tank T. A filter F is also in communication with the distributing pipe M and is provided with a discharge spout S through which water is discharged to a catch-basin K, the latter being preferably formed in a supporting base for the entire apparatus or in the manner clearly shown in Figure 8. The filtered water from the catch-basin K is adapted to be supplied to a forecooler generally designated at E through a pipe W by means of a pump B. The lower end of the pipe W is disposed adjacent the bottom of the catch-basin K, while its upper end is extended through the top of a tank 14, in which is housed the forecooler E.

As illustrated to advantage in Figure 8, the forecooler E comprises a pair of circular troughs 15 arranged concentrically of each other and of substantially V-shape in cross section. The upper end of the pipe W is bent substantially at right angles at its point of entrance into the tank 14 and is provided with two discharge nozzles 16 which overlie the troughs 15 for delivery of water thereto. Arranged within the tank 14 are pipes 17 and 17ª in the form of concentric spirals which are connected to each other and to which liquid ammonia is adapted to be supplied through a pipe 18 connected to the upper ends of the two coils and provided with an expansion valve 18ª. The lower ends of the two coils are in communication with a pipe 19 which extends to a remote point for connection with a compressor (not shown). A stop valve 20 is arranged in the pipe 19 at a point exteriorly of the tank 14 for controlling the passage of ammonia from the coils to the compressor. The bottom of the tank 14 is convexed and extending through the apex of the same is a discharge pipe D having a perforated upper end surrounded by foraminous material as indicated at 21 through which water and air may pass from the tank 14 into the discharge pipe D. The pipe D extends from beneath the tank 14 to the freezing tank T and communicates with the latter through a distributing pipe D' and a plurality of branch pipes $d$. The pipe A is connected to the tank 14 adjacent the top thereof and to a low pressure blower G for supplying air to the tank.

In the operation of the forecooler, the supply of water to the troughs 15 is such that there is a gradual overflow of water from the troughs which in dropping downwardly of the tank mixes with the air under pressure entering the tank through the pipe A. By virtue of the cooling coils 17 and $17^a$, the water and air are chilled to the freezing point by the ammonia traversing such coils. The compressed air which is thus chilled and commingled with the water in the tank 14 travels from the tank 14 through the pipe D to the freezing tank T carrying with it a considerable quantity of water in liquid form. The chilled water and air enters the body of water in the tank T through nozzles 35 hereinafter described, from which the water and air issue in the form of jets whereby the water is agitated and precipitated impurities are replaced by chilled and filtered water.

Referring now to Figures 1, 2, 3, 5 and 6, the freezing tank T in its present embodiment is comprised of a casing $t$ preferably formed of wood and having a pulverized cork lining. Within the casing are arranged a plurality of metallic tanks $t'$ each of which constitutes a freezing unit. The confronting sides of any two adjacent tanks $t'$ are maintained in spaced parallel relation by means of bars 22 secured to the tanks by counter-sunk rivets 23. As clearly shown in Figure 2, the bars 22 are arranged to provide a tortuous passageway or duct 24 which communicates at its upper end with an inlet pipe 25, and at its lower end with an outlet pipe 26. All of the pipes 25 are connected to a main distributing pipe 28, and all of the pipes 26 are connected to a main collecting pipe 29, in the manner clearly shown in Figure 1. The pipes 28 and 29 are adapted to be extended and to effect communication with a compressor (not shown) for effecting a circuit communication between the several ducts and compressor in a manner which will be well understood by those skilled in the art for supplying liquid ammonia to the several ducts and returning the ammonia vapor to the compressor.

As shown in Figures 1, 3, 5 and 6, each tank $t'$ is divided longitudinally into a plurality of compartments by means of partitions R removably fitted within the section and maintained in vertical position by means of pins 30 formed on the lower edge of the partitions and seated within suitable openings formed in the bottom wall of the section. These pins 30 coact with the lugs 31 formed on the upper end of the partition as clearly shown in Figure 10, such lugs being adapted to be seated within suitable grooves formed in the side walls of the section. As shown in Figure 10, each partition R is formed adjacent its upper end with a slot 32 which in the applied position of the partition is adapted to effect communication between any two adjacent compartments to permit of the overflow of water from one compartment to pass into an adjacent compartment and to thereby effect the same level of water in all of the compartments.

As illustrated to advantage in Figures 3 and 4, water is supplied to all of the tanks $t'$ from the common distributing pipe M and to the several compartments of any one tank through the branch pipes $m$ arranged beneath the tank T and provided at regular intervals with nozzles 33 which extend through suitable openings formed in the bottom of the tank T. The arrangement of the nozzles 33 is such that one nozzle is provided for each compartment of each tank $t'$ so that the several compartments of any one tank can be filled simultaneously. The bottom of each tank $t'$ is formed by means of a channel bar 34 arranged in inverted relation so that flanges form supporting means for maintaining the intermediate portion in spaced relation to the bottom of the tank T. This intermediate portion of the channel bar 34 is formed at regular intervals with openings sufficiently large to readily accommodate nozzles 35 formed on the pipe $d$ and at such intervals that one nozzle is provided for each compartment of each tank $t'$ as clearly shown in Figure 3. As shown in Figures 3 and 5, the pipe $d$ for each tank $t'$ extends beneath the corresponding channel bar 34 and throughout the length of the tank with one end projecting from the casing and connected to the main distributing pipe D'. The openings in the channel bar 34 are sufficiently large to allow the free passage of water from the nozzle 33 upwardly into the compartments.

As illustrated to advantage in Figure 3, the level governor L comprises in the present instance a tank 36 in communication with the distributing pipe M through a pipe 37. The pipe M communicates with the filter F through a pipe 38 and a T-joint 39 having a valve seat 39ª formed therein and upon which a valve 40 is adapted to seat. The valve 40 is carried by the lower end of a rod 41 movable longitudinaly within the pipe 37 and connected at its upper end to a lever 42 fulcrumed at the point indicated at 43, all of which are arranged within the tank 36.

The level governor is adapted to control the level of water within the freezing tank T during the early stages of the freezing operation, and in the following manner; water entering the tank 36 from the supply pipe P traverses the pipes 37, M and branch pipe m, the water entering the compartments of the tank t' through the nozzles 33. In the normal position of the governor, the float 44 is lowered so that the valve 40 is closed upon its seat 39ª thus preventing the passage of water to the filter F. However, as the level of the water in the tank T rises, the float 44 also rises, and when the float occupies the position shown in Figure 3, the valve 40 is moved to open position thus preventing the further supply of water to the tank T and maintaining the water level shown. With the valve 40 open, the water from the pipe P enters the filter F, and after the filter is discharged through the pipe S into the catch-basin K. In the latter stages of the freezing operation the supply of water flowing in through the pipe P is cut off.

The operation of the entire apparatus is as follows: Let it be assumed that the tank T is filled with water at the level shown in Figure 3 and that liquid ammonia is being circulated through the several ducts 24 in the manner previously described. With the forecooler operating air and water is supplied therefrom to the water within the freezing tank so as to effect an agitation thereof and to thus expose all parts of the water to the freezing surface or side walls of the ducts 24 and also to supply the water necessary to replace the precipitated impurities as the freezing operation and formation of the blocks of ice is nearing completion. This obviously facilitates the freezing action of the refrigerant, and also effects a precipitation of the impurities or foreign matter contained in the water. This precipitation of the impurities is most efficient during that period in which the temperature of the water is approximately 32° Fahrenheit, I having found by experiment that with the water at this temperature a precipitation of the impurities can be readily effected. The introduction of the chilled water and air into the body of water in the freezing tank prevents the formation of air pockets or of slush cores in the blocks of ice and since all impurities have been precipitated the blocks of ice produced are entirely clear and pure.

The supply of chilled air and water to the tank T continues until the water is frozen, the foreign matter deposited to the bottom of the tank being ultimately conveyed to the filter F by reason of the fact that with the tank T filled water continues to flow from the level governor tank to the filter in the manner previously described thereby causing an efflux of water from the tank T thereby carrying the foreign matter to the filter. With the foreign matter removed from the tank it will be clear upon refilling the tank and again supplying chilled air and water thereto that the water will be purified in the succeeding freezing operations.

By virtue of the partitions R the water is frozen into blocks of ice of a predetermined size, and for faciliating the removal of these blocks of ice, I have provided stirrups H which as shown in Figure 7 are of substantially U-form with the horizontal portion thereof formed with an opening 45 adapted to register with any one of the openings of any one of the channel bars 34 in the manner clearly shown in Figures 3 and 5. The stirrups H are such that their upper ends project above the ice so that when the lids of the tanks T' are raised the stirrups can be gripped to effect the removal of the blocks of ice.

As clearly shown in Figure 5 and also in Figure 1, the lowermost of the bars 22 have their top surfaces disposed in the same plane and these top surfaces lie above the bottom of the casing and are coplanar with the underside of the intermediate portion of the channel bars 34. The anhydrous liquid ammonia does not exert a cooling effect below the plane defined by the top surfaces of these bars 22 and it may thus be said that there is in this manner defined an isothermal line and it is substantially at this isothermal line that the agitated air is projected into the water. As the air pipes are disposed below the point at which the anhydrous liquid ammonia exerts its cooling effect any liability of these pipes freezing is precluded. It is to be noted moreover that in the forecooler the air and water are chilled to 32° Fahrenheit while being commingled. This of itself precludes the possibility of an excessive amount of water finding its way into the air pipes and additional precautions have been taken to this end by providing the screened connection 21 to the air pipe, D.

From the foregoing it will be understood that the invention involves a process of manufacturing ice which consists in circulating anhydrous liquid ammonia in direct freezing relation to a body of water in such manner that the cooling effect produced by the ammonia operates directly to bring about the formation of a block of ice thereby eliminating the use of brine, or other intermediate agent and thus gaining in efficiency what is always lost when brine or the like is made use of. Moreover the anhydrous liquid ammonia is circulated in direct freezing relation to the body portion in such a manner as to establish an isothermal line and at this isothermal line commingled water and air cooled to approximately 32° Fahrenheit are injected into the body of water from which the ice is to be formed. By establishing the isothermal line and injecting the water and air at this line the liability of the water freezing in the pipes which supply it to the body of water is obviated. The commingled water and air thus injected serves to agitate the body of water and to replace the precipitated impurities with filtered water from which the ice is in part formed. During the freezing action incident to the circulation of the anhydrous liquid ammonia the body of water is maintained at substantially constant volume while the precipitated impurities are carried off and the water which serves to carry off these precipitated impurities is filtered while it is at a temperature of aproximately 32° Fahrenheit and it is the filtered water thus obtained that is utilized to form the commingled water and air.

Although I have herein shown and described only one process of purifying water, one process of manufacturing ice and one apparatus, all embodying my invention, it is to be understood that various changes and modifications may be made herein without departing from the spirit of the invention and the spirit and scope of the appended claims.

What I claim is:

1. A process for manufacturing ice which consists in utilizing a refrigerant to freeze a body of water; in maintaining the body of water at a substantially constant volume while carrying off the precipitated impurities; in filtering the water in which the impurities are present while the same are at approximately 32° Fahrenheit; in utilizing the filtered water thus obtained to form commingled water and air; and injecting into the body of water the combination of water and air to agitate the body of water and replace the precipitated impurities with filtered water from which the ice is in part formed.

2. A process of manufacturing ice which consists in circulating anhydrous liquid ammonia in direct freezing relation to a body of water in such manner as to establish an isothermal line and in injecting into the body of water at the isothermal line commingled water and air cooled to approximately 32° Fahrenheit.

3. An apparatus for manufacturing ice comprising a freezing tank, refrigerating means associated with said tank, means for continuously supplying water to said tank during the initial stages of the operation, a discharge outlet leading from said tank, float controlled valve means for regulating the outflow from said tank and thereby maintaining a predetermined level of water in said tank, the water flowing through the discharge outlet carrying out the precipitated impurities, means for filtering the water flowing through said outlet, means for utilizing the filtered water to form commingled water and air and for injecting the commingled water and air into the water in said freezing tank to agitate the water in said freezing tank and to replace the precipitated impurities with filtered water during the latter stages of the operation.

4. In an apparatus for manufacturing ice, a freezing tank comprising a casing formed of heat insulating material, a plurality of water receiving sections within said tank having their confronting side walls spaced apart to provide passageways, bars arranged in said passageways to define tortuous ducts, the lowermost of said bars being arranged in substantially the same plane and being arranged above the bottom of the casing and defining an isothermal line, inverted channel bars arranged at the bottom of said water receiving sections, air pipes arranged beneath said channel bars and below said isothermal line and having nozzles extending into said water receiving sections, and water pipes disposed below said freezing tank and having nozzles extending into said tank and beneath said channel bars.

5. An apparatus for manufacturing ice comprising a freezing tank, refrigerating means associated with said tank, means for continuously supplying water to said tank, a discharge outlet leading from said tank, float controlled valve means for regulating the discharge through said outlet and thereby maintaining a predetermined level of water in said freezing tank, the water flowing through the discharge outlet carrying out the precipitated impurities, means for filtering the water flowing through said discharge outlet, and a fore cooler utilizing the filtered water to commingle water and air cooled to 32° Fahrenheit and connected to the freezing tank for injecting commingled filtered water and air into the water in the freezing tank to agitate the same and to replace the precipitated impurities with filtered water.

6. A process for manufacturing ice which consists in circulating a refrigerant in freezing relation with respect to a body of water and in injecting into the body of water commingled water and air previously cooled to approximately 32° Fahrenheit.

7. In an apparatus of the character described, a freezing tank adapted to contain a body of water, means for circulating a refrigerant in freezing relation with respect to a body of water in said tank, a fore cooler having means for commingling air and water and having means for cooling the commingled air and water to approximately 32° Fahrenheit, and means for conveying the commingled air and water from the fore cooler to the freezing tank and for injecting the commingled air and water into the body of water in the freezing tank.

ROBERT F. LINDSAY.